K. F. ZIEHM.
CALCULATING MACHINE.
APPLICATION FILED MAR. 3, 1914.

1,110,734.

Patented Sept. 15, 1914.

Witnesses:
Marshall Low
N N Low

Inventor,
Kurt F. Ziehm
by Munday, Evarts, Adcock & Clarke
his Attorneys

K. F. ZIEHM.
CALCULATING MACHINE.
APPLICATION FILED MAR. 3, 1914.

1,110,734.

Patented Sept. 15, 1914.
9 SHEETS—SHEET 6.

UNITED STATES PATENT OFFICE.

KURT F. ZIEHM, OF CHICAGO, ILLINOIS, ASSIGNOR TO FELT & TARRANT MANUFACTURING COMPANY, A CORPORATION OF ILLINOIS.

CALCULATING-MACHINE.

1,110,734.      Specification of Letters Patent.      Patented Sept. 15, 1914.

Application filed March 3, 1914. Serial No. 822,140.

*To all whom it may concern:*

Be it known that I, KURT F. ZIEHM, a citizen of the United States, residing in Chicago, in the county of Cook and State of Illinois, have invented a new and useful Improvement in Calculating-Machines, of which the following is a specification.

My invention relates to multiple-order key-driven calculating machines, and particularly to such calculating machine as the well-known comptometers set forth in, among others, the prior United States Patents Nos. 762,520 and 762,521 of June 14th, 1904; No. 767,107 of August 9th, 1904; No. 960,528, of June 7th, 1910; No. 992,950 of May 23rd, 1911; No. 996,009 of June 20th, 1911; No. 1,003,723 of September 19th, 1911; No. 1,028,344 of June 4th, 1912; No. 1,066,096, of July 1st, 1913; No. 1,072,933 of September 9th, 1913; Nos. 1,074,704 and 1,074,705 of October 7th, 1913; the foregoing patents having been granted on applications of Dorr E. Felt; No. 1,072,934 of September 9th, 1913, to Felt and Turck; and No. 1,074,689 of October 7th, 1913, to G. S. Bollensen.

The invention has for an object to provide a calculating machine of the general character set forth in the said Patent No. 1,072,933 in respect of the incidental safety locks against mismanipulation of the finger keys and erroneous results arising therefrom; that is to say, locking mechanism adapted to lock a key, after its adding movement, against a further adding movement until the key has been restored to normal position, and also locking mechanism adapted, on partial depression and release of a key, to lock other keys of the said adding mechanism against depression; but not comprising the normal safety lock of the said patent or the two-part keys and side interference guards thereof. And the invention has for a further object the effecting of such locking action through the manipulation of unitary or substantially one-part keys having a single-part key-stem or key-top to receive the finger-stroke. And the invention has for further objects the effecting of all other improvements in structure or function that may be found to obtain in the mechanism hereinafter described or claimed.

In order to make the invention more clearly understood I have shown in the accompanying drawings means for carrying the same into practical effect, without limiting my improvements, in their useful applications, to the particular constructions which, for the purpose of explanation, I have delineated.

In the said drawings

Referring to the drawings, 1 indicates the vertical retaining plates constituting a part of the frame of the machine, and 2 the top plate thereof. The frame preferably comprises vertical side or retaining plates, such as are shown at 1, and similar intermediate plates one of which is arranged in each of the spaces between the various orders or columns of the machine and between the numeral wheels 3. All of these vertical plates are secured to or mounted on a base (not shown) and are or may be rigidly connected with each other by suitable cross bars or tie rods 4.

The accumulator mechanism, including the numeral wheels, is driven and caused to be actuated in the calculating operation by denominational series of finger keys 2' mounted to reciprocate vertically in guide apertures or bearings in the top plate 2, and the lower end of each key stem is pressed upward by a lever 5 and spring 6 carried by lower frame parts 7.

For convenience I will recapitulate certain of the parts, and their functions, known in and by the prior patents above mentioned; but it is not necessary to an explanation of the present improvements to repeat all of the description and illustration of said patents. The principal parts are as follows: Column actuators or segment levers 8 pivotally mounted at 9 on the rear part of the frame 1 and yieldingly held up by accumulator-actuating springs 10; odd and even stop levers 11, 12, each of which may comprise two separate co-acting parts, the main lever portions of which are pivoted to the rear of the frame at 13; accumulator pinions 18 mounted on the cross pivot accumulator shaft 19 and engaged and turned by the segments of the column actuators 8; accumulator ratchets 20 fixed to the pinions 18; lantern wheels 21 having pawls pivoted thereon and arranged within the ratchet, whereby the ratchets turn backward freely but on their forward movement rotate the lantern wheels by means of the said pawls; intermediate gears 24 on the intermediate pick-up shaft 25, which are engaged and driven by accumulator gears attached to the lantern wheels and which engage and drive the numeral wheel gears 27; suitable carrying mechanism (as shown) operating between the several orders of the machine to carry accumulations from a lower to a higher order.

The machine is of the duplex type; that is to say, two keys side by side, in different orders, may be simultaneously depressed and each will have its proper and full effect in the accumulation. To this end the carrying mechanism is adapted to permit prime actuations of the accumulator mechanism in a plurality of orders simultaneously. That such full effect of the depression of the key of lower order be attained it is necessary that any carrying, which may be due to take place from the lower numeral wheel to the higher numeral wheel, shall not be lost by reason of the higher numeral wheel having such forward motion that the carrying mechanism may not affect it. The construction and operation of the parts above referred to can be most conveniently understood by reference to the said Patent No. 960,528.

With the above described accumulator mechanism is to be combined a suitable canceling mechanism, preferably that set forth in the said Patents No. 1,072,934 and No. 1,072,933, not necessary to be further described in detail in connection with the present invention.

Figure 1:
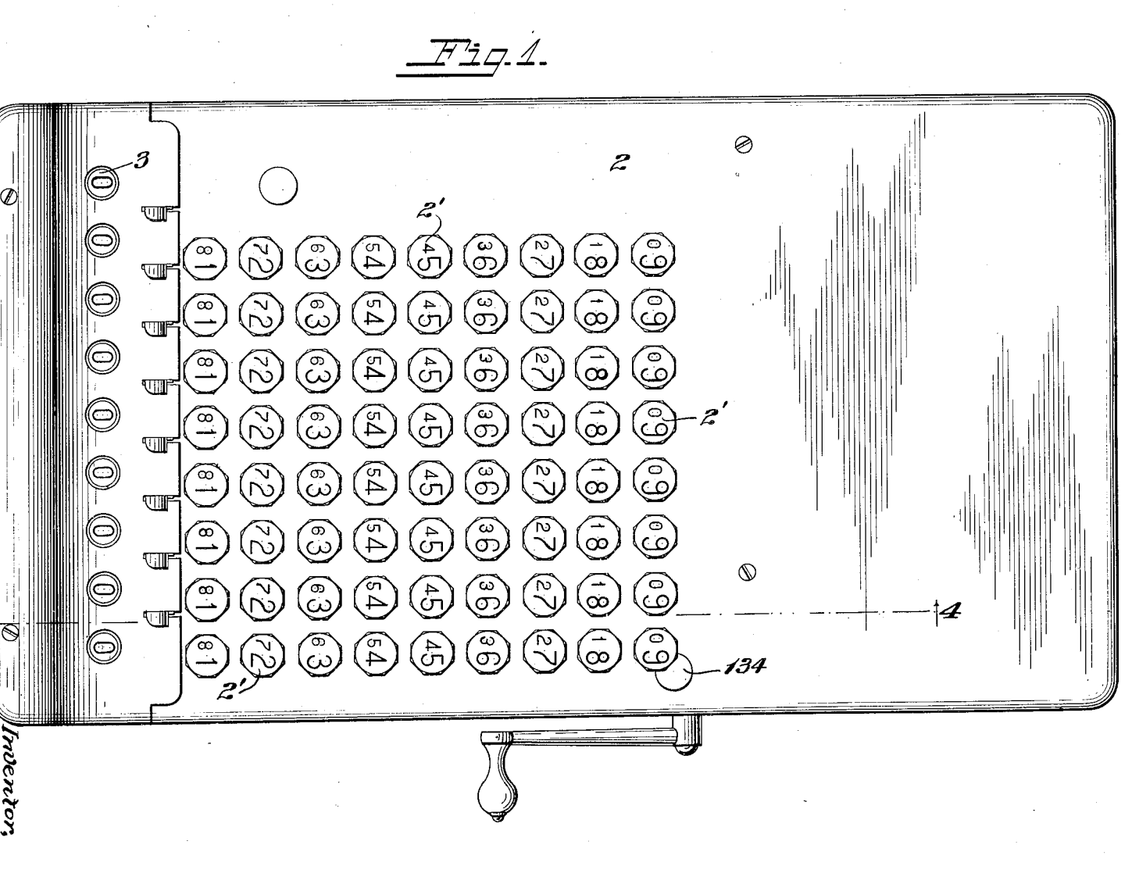
—Figure 1 is a plan view of a calculating machine embodying the invention.
Figures 2, 3:
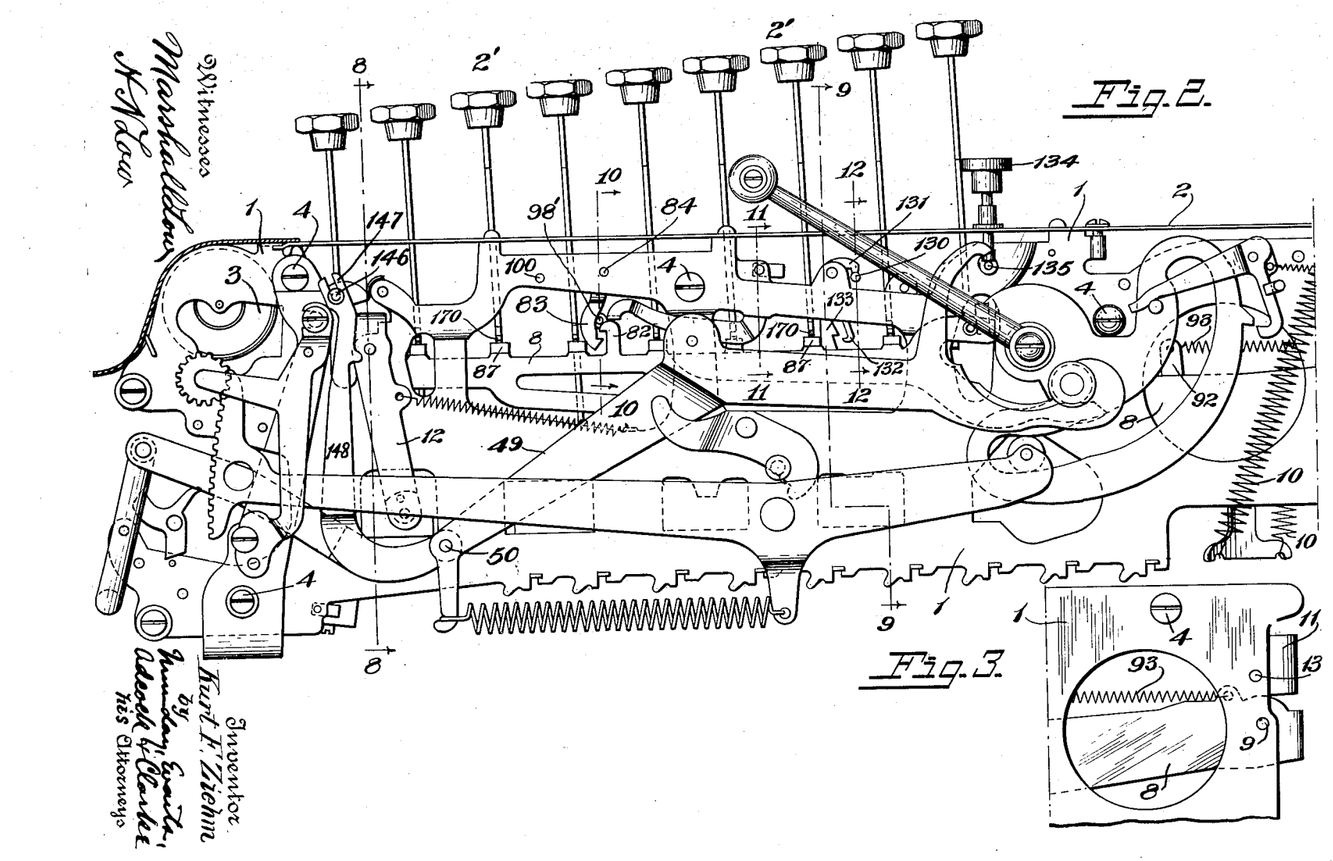
Figs. 2 and 3 show a side view of the same, on a larger scale, looking at the machine from the right hand side, with the side casing removed.
Figure 4:
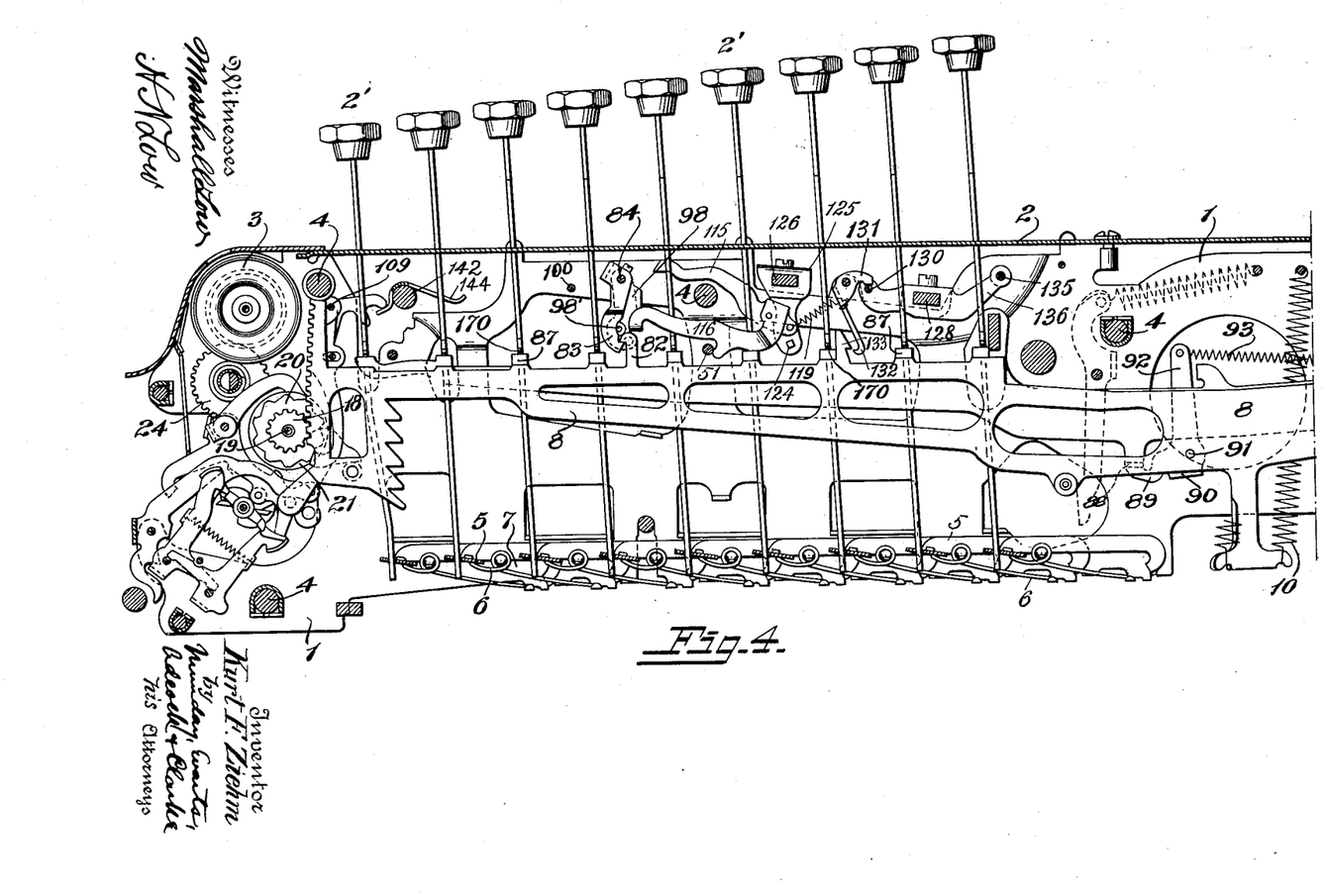
Fig. 4 is a longitudinal vertical section, partly in elevation, of a portion of the same, one line 4—4 of Fig. 1.
Figure 9:
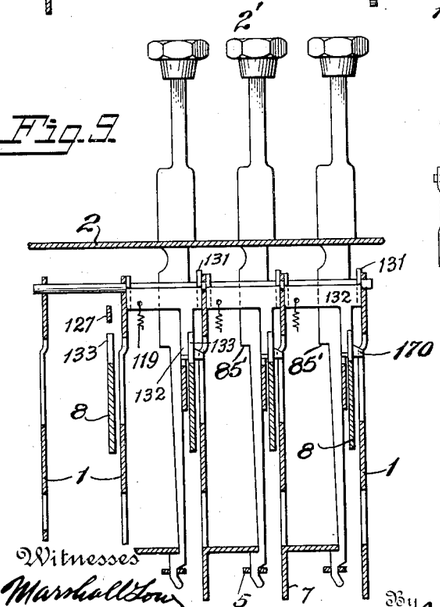
Fig. 9 is a vertical cross section of a part of the machine on line 9—9 of Fig. 2, some of the parts being omitted.
Figure 10:
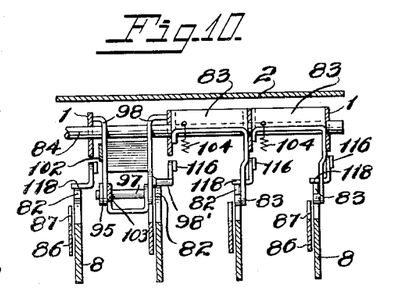
Figs. 10, 11 and 12 are detail views, in vertical cross section, respectively on lines 10—10, 11—11 and 12—12, of Fig. 2, showing parts of the locking mechanism.

I will now refer to the principal parts of the safety locks for the accumulator mechanism and, under some conditions, the finger keys. 82 is a hook (Figs. 4, 10, 14) with which each column actuator 8 is formed or provided, and with these hooks are engaged corresponding swinging hooks 83 pivoted on a cross rod 84 fixed in the frame. Since the key stem engages the top of the column actuator by a shoulder or projection 170 (Figs. 15, 9, 2) the key cannot be operatively depressed till the hooks 83 have been swung forward out from under the actuator hooks 82. 86 is a lock lever (Figs. 13, 6, 10, 8, 15), one for each column arranged at the side of the column actuator and pivoted on the same cross rod 9 which forms the pivot for all of the column actuators. It is formed on its upper edge, as by projections 87, to be properly engaged by the shoulder 170 so that when the key is sufficiently depressed the lock lever is depressed in advance of the column actuator. The lock lever is further provided with a lateral projection 88 which rests on the horizontal forwardly extending arm 89 of an elbow lever 90 pivoted at 91 (Fig. 6) on the column actuator. The elbow lever has an inner vertical arm 92 which is connected by a spring 93 with the actuator, so that the elbow lever is normally pulled back into vertical position with its horizontal arm bearing up against the lock lever projection 88; it also has an outer vertical arm 94 which is connected by a pivot 94' with a forwardly extending link 95. The pivot is fixed on the arm 94 and the link receives the pivot in a horizontal slot 95', which allows a slight forward and backward yielding of the parts, the rear end of the slot being normally pulled closely against the pivot by a spring 96.

When the lock lever is depressed by the key shoulder 170 (Fig. 6), the projection 88 and arm 89 cause the arm 94 of the elbow lever to rock forward on the actuator and thrust forward the link 95 yieldingly through a pull on the spring 96. This link is connected by a pivot 97 with a pair of forwardly and backwardly swinging links 98 pivotally supported at 84 on the frame and limited in movement by a fixed cross rod 100 which enters a vertical slot 101 in an arm 102 of the said links. The links carry a pin 98' which extends outward at the rear side of the actuator-locking hook 83, so that the forward thrust of the link 95 disengages the hook from the corresponding actuator hook
82. When such disengagement occurs in the column in which the depression of a key has been properly begun, the actuator of that column is free to be depressed when its top edge is encountered by the lateral shoulder or projection 170 on the key stem, and the key and stem are free to follow the actuator downward. In this movement the lateral projection or shoulder 85' of the key stem encounters the proper stop lever, 11 or 12, according to whether the key is odd or even, and depresses it, and thereby properly positions the stop detent 15 or 16, to arrest the actuator at the proper degree of depression to have on the accumulator mechanism.
when the actuator rises, an additive effect corresponding with the designation on the key.

Figures 5, 6, 7:
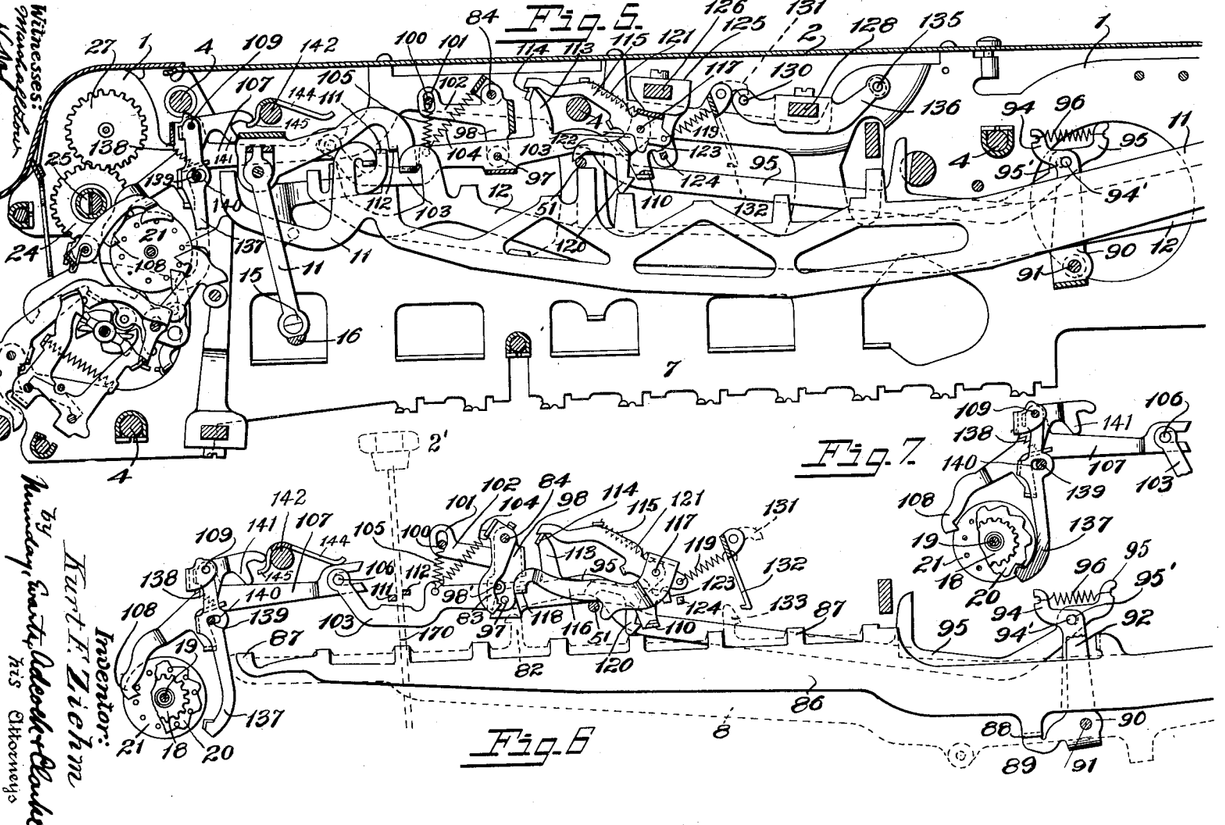
Fig. 5 is a longitudinal vertical section showing in elevation the locking mechanism.
Fig. 6 is an elevation of the locking mechanism detached, with a key depressed.
Fig. 7 shows the front portion of the locking mechanism, with the pawl 137 engaged.
Figure 8:
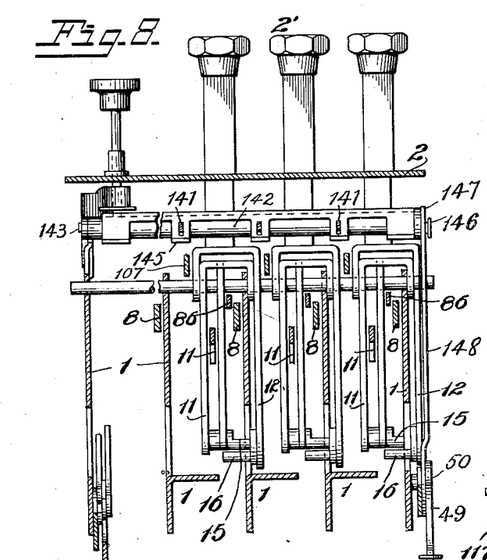
Fig. 8 is a vertical cross section, partly broken away on line 8—8 of Fig. 2, some of the parts being omitted.

Following, is described the accumulator lock, one in each column, which incidentally and automatically locks the accumulator during normal key action except while the additive function is being performed (Figs. 5 and 6): The pin 97 carries a forwardly and backwardly, and upwardly and downwardly movable part, such as a lever 103 pivoted thereon between the links 98, the links being yieldingly pressed backward and the forward arm of the lever upward by a spring 104 which connects said parts. The forward end of the lever is also pressed upward by a spring 105 which unites it with the fixed cross rod 100. The forward end of the lever is provided with a pin 106 which enters the slotted arm 107 of an accumulator detent 108 pivoted on the fixed cross pivot rod 109, the arrangement being such that the upward and downward movement of the front arm of lever 103 and the arm 107 of the detent will respectively engage and disengage the detent with and from the lantern wheel 21 or equivalent engageable part of the accumulator driving mechanism. When the said detent engages the lantern wheel it and its accumulator mechanism are locked against rotation, and it is necessary to remove the detent when and as the additive function of the actuator is performed. The detent 108 is or may be normally out of engagement with the accumulator (Fig. 7), but the first downward movement of the key causes the pin 106 to be thrust forward in the slot of the detent arm 107, and when the actuator is then depressed by the key stem it allows to move down a lateral arm 110 fixed on the rear arm of the lever 103 and extending over and normally held up by the actuator. The forward arm of the lever, being normally pressed upward by the springs 104 and 105, now rises and throws the detent 108 into engagement with the accumulator wheel 21 (Fig. 6). When the actuator is at or near the bottom of its depression the detent 108 is removed from the accumulator wheel by the action of a side projection 112 (111 in case of the odd lever) on the side of the stop detent lever element 12, which projection depresses the lever 103 at the front end and tilts the detent out from the accumulator wheel. The lever 103 carries forward with it, in its downward and forward rocking movement, an arm 113 having a lateral projection 114. 115, 116 is a lever pivoted on a cross pivot rod 117 fixed in the frame and having its inner (right) arm 116 arranged parallel with the column actuator and provided with a lateral projection 118 which bears downward on the actuator and is released as the actuator moves downward; and having its outer (left) arm 115 arranged in the path of the projection 114. This lever is yieldingly pressed forward and downward by a spring 119. Just as the detent 108 comes out of the accumulator wheel the arm 115, which is resting on the projection 114, is allowed, by the forward tilting of the arm 113, to drop behind said projection; which locks the detent 108 in its disengaged position, leaving the accumulator free to be turned in the immediately ensuing adding operation. There is a further means for locking the accumulator detent out of the lantern wheel, comprising a latch 120 which hooks under the lateral arm 110 of the lever 103 while the actuator is coming up, and is so held by a spring 121. This prevents the lever 103 from tilting to throw the detent 108 into engagement, and it so remains till the actutor is nearly up.

An arm 122 of the latch rests on the fixed cross rod 51 to limit the backward position of the latch, under the pull of spring 121, relative to the arm 110. As the actuator arrives at its highest position, and with it the auxiliary lever, the lateral outward projection 88 on the auxiliary lever lets up the arm 89, and the link 95 and lever 103 move backward carrying the arm 110 off from, and slightly below the point of the latch 120. The detent 108 is now out of the lantern wheel. It is not locked out but is spring-held out by the upward pressure of the actuator under arm 110. When any key is partially depressed, and released, the spring 6 at the bottom of its stem will throw it up, but the actuator starting to turn the accumulator mechanisms, turns a pin of the lantern against the detent 108 (which has been thrown into the lantern as above described), which arrests the accumulator against forward turning and holds down the actuator, preventing accumulation, and the error is signaled by the locking of the other actuators and keys, as hereinafter described.

On the initial depression of a key, as above described, when the lever 103 moves forward, the arm 110 encounters the latch 120 on the point of its hook and forces it forward slightly and follows down (as the rear arm of the lever 103 tilts downward under pull of springs 104, 105) along the incline of the hook of the latch, thus escaping being locked up. When from this position the arm 110 is tilted upward it displaces the latch forward, and the spring 121 returns the latch under the arm to hold it up.

Figure 11:
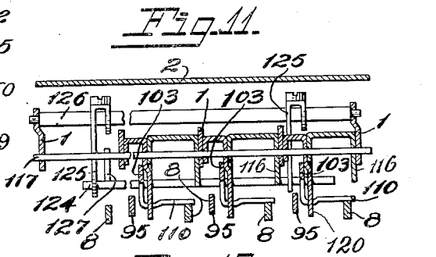
Figure 12:
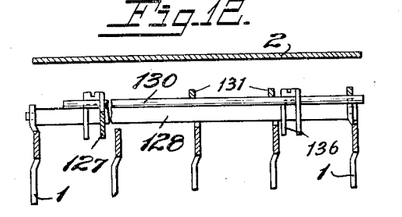

I will now describe the lock for actuators in other columns when a key is partially depressed and released. When a key is partially depressed and released the forward end of lever 103 is elevated and so held by springs 104 and 105, as above described. On the release of the key the actuator remains down, the accumulator being held from turning by the detent 108; but the auxiliary lever 86 rises and lets up the arm 89, and the spring 93 pulls back the link 95 and lever 103, and the rear end 123 of the lever encounters and thrusts backward the square shaft 124 hung by arms 125 from the rock bar 126. The rear arm of the lever 103 is limited in its downward movement by the cross rod 51, and in so acting on the shaft 124 it may slide rearward on said rod. This square shaft extends across and is common to all of the columns, and is adapted to be thus engaged by the lever 103 of each column. On this movement a hook 127 (Figs. 11, 12), formerly resting on the top of the shaft 124, drops down, allowing rock shaft 128, to which the hook is attached, to turn with it under the pull of the springs 119 through the media of the hook tails 131. The hook 127 and other arms on the rock shaft 128 carry a cross rod 130, which bears up under the tails 131 of swinging hooks 132 (Fig. 5). These hooks, one for each actuator, are allowed to swing forward under hooks 133 on the actuators, being pulled forward by the springs 119, thereby locking up each actuator, excepting the one partially depressed. No further accumulation can be performed in the other orders until these locks are released. Complete depression of the key formerly partly depressed will give the accumulation intended in its order, and thereupon the actuator of this order rises and is also locked up, its hook 133 having deflected backward, and then interlocked with, the swinging hook 132. All keys in all orders may be now released by depressing the release key 134, which bears on cross rod 135 in the rear arms 136 of the rock bar 128, and throws up the hook 127, allowing the square shaft 124 to swing forward to a position under the end of the hook, thereby holding up the hook ready for a new locking operation in case another key be partly depressed. Before the correction, by completely depressing the key formerly partly depressed, the operation of the release keys will not release permanently all of the keys, because the shaft 124 is now in its rearward position and will not support the hook 127, and the hooks 132, 133 will reëngage as soon as the release key 134 comes up. Shaft 124 is held rearward by the end 123 of lever 103.

Following is a description of the upstroke lock (Figs. 5, 6 and 7) which operates when a key has been fully depressed and is attempted to be re-depressed without letting it all the way up; 137 is a pawl pivoted at 109 to the frame and adapted to engage the exterior of the ratchet 20 for the accumulator. It is pulled toward the ratchet by a spring 138 which connects the pawl below its pivot with a part of the detent 108. The play of the pawl is limited by a fixed cross rod 139 situated in a slot 140 of the pawl. The pawl has an offset arm 141 which is on or over the rearwardly extending arm 107 of the detent. When a key is being depressed the said detent arm is at such a height that it holds up the pawl arm 141 and keeps the pawl clear of the ratchet (Fig. 6), but when the key has been completely depressed the detent arm is carried downward and the pawl engages the ratchet under the influence of its spring. The key may now be released or allowed to return normally, and the ratchet will turn forward by the operation of the actuator, the ratchet teeth smoothly tripping the pawl. But if the operator press down again on the key while it is coming up, and without waiting for it to complete its stroke, the pawl immediately engages a ratchet tooth and causes the accumulator to be locked against forward turning by the key and an erroneous accumulation; and the key is locked against further depression, and the operator is compelled to let the key rise completely without having made an error. 142 is a rock bar pivoted at 143 to the frame. It carries a series of rearwardly extending arms 144, one for each column, which are arranged over the rear forked ends 107 of the detent levers 108. It also carries corresponding forwardly extending arms 145 arranged under or within the rearwardly extending arms 141 of the pawl 137. When the bar is rocked backward the arms 144 and 145 act to disengage the detents 108 and pawl 137 from each lantern wheel and ratchet, and leave the whole accumulator mechanism free from said detents and pawls for the purpose of cancellation or resetting. The rock bar 142 is provided with a forwardly extending crank arm 146, which is engaged by the forked end 147 of a link 148. The lower end of this link is pivoted at 50 to the forward arm of one of the release bar levers 49, so that at the beginning of the movement of the canceling actuator the bar 142 is rocked and the accumulator of each column is released, as above described, in case any detent 108 is in engagement with its lantern wheel. Also it releases the lever end 123 from the cross bar 124.

Figures 13, 14, 15:
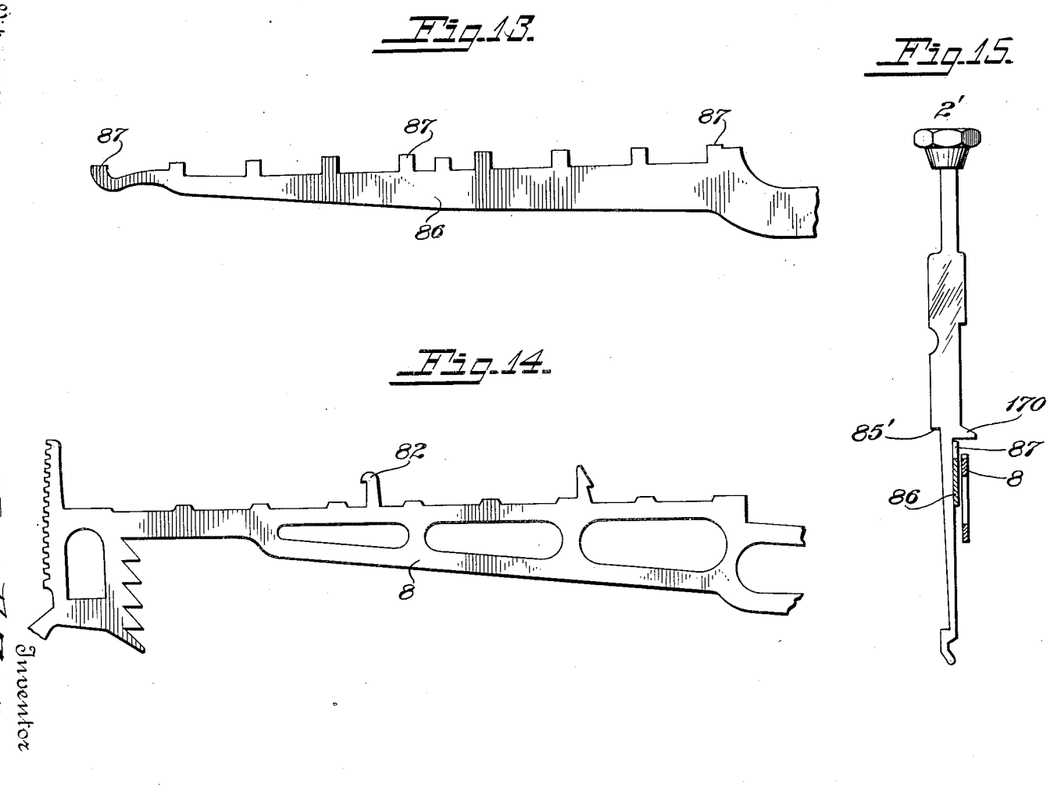
Figs. 13 and 14 are respectively side views of the auxiliary or lock lever, and of the column actuator lever, the rear portions of the same being omitted.
Fig. 15 is a vertical transverse sectional view showing the preferred relation of a finger key to the lock lever and to the column actuator, other parts of the machine being omitted.
Figure 16:
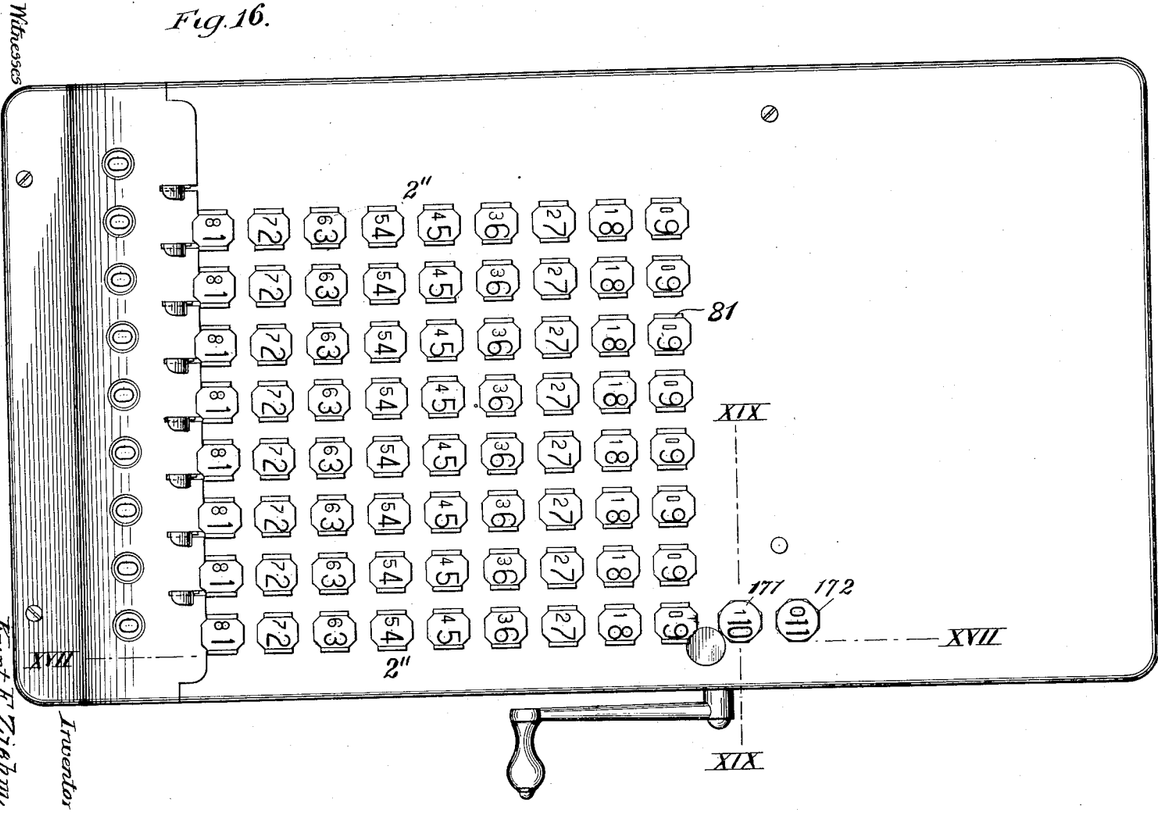
Fig. 16 is a plan view of a form of the machine showing extra keys at the head of the units column, beyond the nine key; these keys, having no keys beside them, being unitary and not provided with interference guards, while the other keys of the machine having keys beside them are two-part keys provided with interference guards.

According to that feature of my present invention which relates to the release of the column actuator lock (83, 82), the key is made unitary, as is seen from the foregoing description and is best illustrated in Fig. 15, and is provided with means, for example the shoulder or projection 170, moving constantly with or substantially rigid with the key finger button, which means engages both the lock lever and the column actuator, for actuating both the accumulator mechanism and the locking mechanisms which secure the accumulator mechanism from operation, and, under some conditions, secure the keys.

In the machine described by way of example, the accumulation registering devices consist of numeral wheels, one for each order, and numbered according to the decimal system from zero to nine. It will be understood however that the invention is not confined to the particular registering devices shown, nor to a decimal system of numeration.

It will be understood that when unitary keys are employed in the normal orders of the machine, the shoulders 170 of such keys will first engage and operate their lock levers, and subsequently their column actuators, the key engaged surfaces or edges of the lock lever being a little higher, for such purpose, than are the corresponding surfaces of the column actuator (Fig. 15).

The application of my present improvements to such of the comptometers, described in the patents referred to in the early part of this specification, as have two-part keys, examples of which are Patents Nos. 1,003,723; 1,028,344; 1,066,096; and 1,072,933; consists in part of making the said keys unitary. By "unitary" it is not intended that the key and all of its lock-operating parts are made in one piece, but that the lock-releasing function of the key is not dependent upon a key having separately movable parts as in the case of the two-part keys above referred to.

All of the keys need not be unitary, and in Figs. 16 to 22 I have illustrated a calculating machine in which those keys 2″ which are side by side are two-part, comprising side interference guards or wings 81 carried on the key stem which drives the column actuator, the auxiliary or lock lever 86′ being preliminarily depressed by the spring tube 79 which is rigid with the finger button of the key; all as fully described in said Patent No. 1,072,933. And with said two-part keys are combined extra keys 171, 172 in this instance at the head of the units column, having an accumulating value of ten and eleven respectively, suitable for what is known as a pounds, shillings and pence (L. s. d.) machine. These keys 171, 172 having no keys beside them which they are to guard, or from which they are to be guarded, are made unitary, as has been described in connection with the keys 2′.

Figures 17, 18:
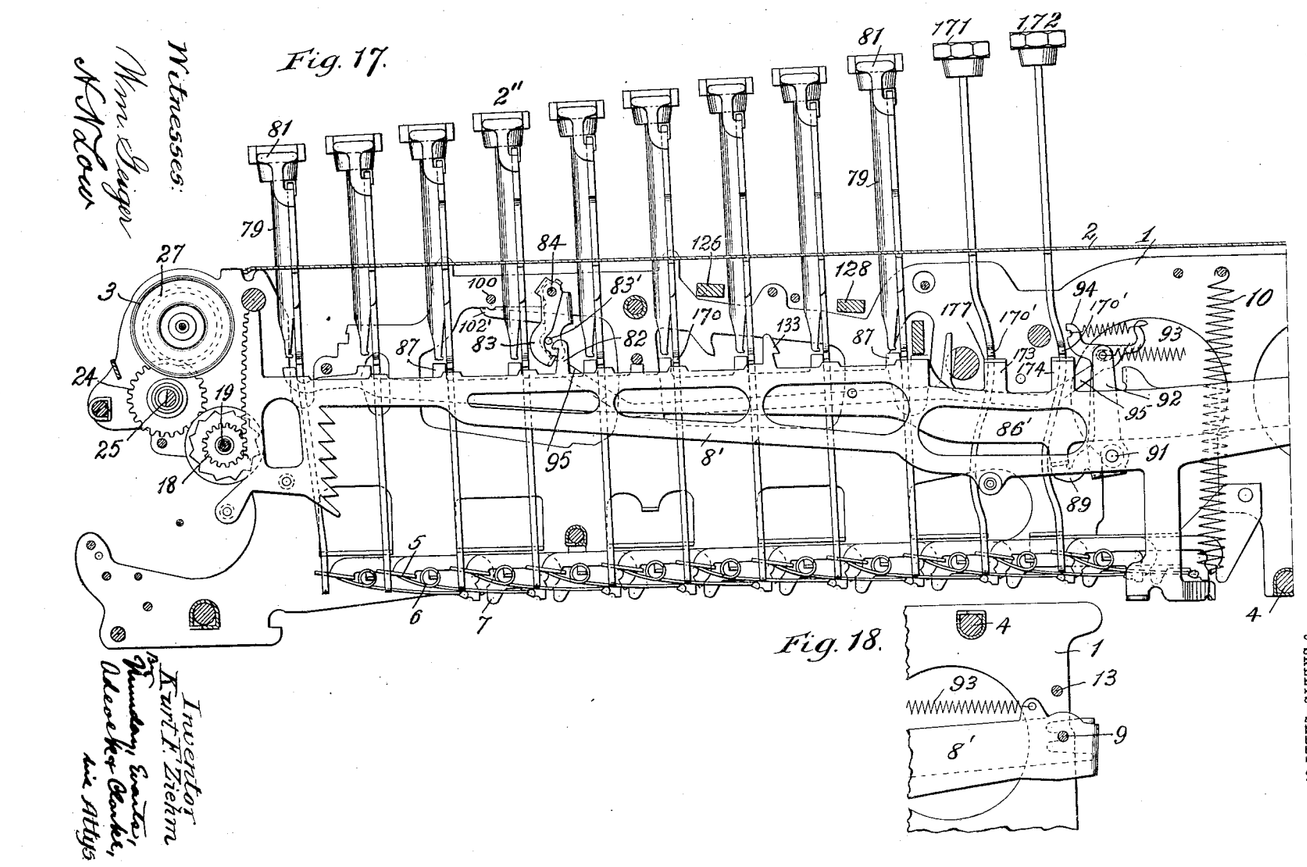
Figs. 17 and 18 show a longitudinal vertical section of the same on line XVII—XVII of Fig. 16.

The column actuator 8′ for the units column is provided with steps 173, 174 for engagement by the shoulders 170′ of said keys 171, 172, respectively (Fig. 17).

Figures 19, 20, 21, 22, 23, 24:
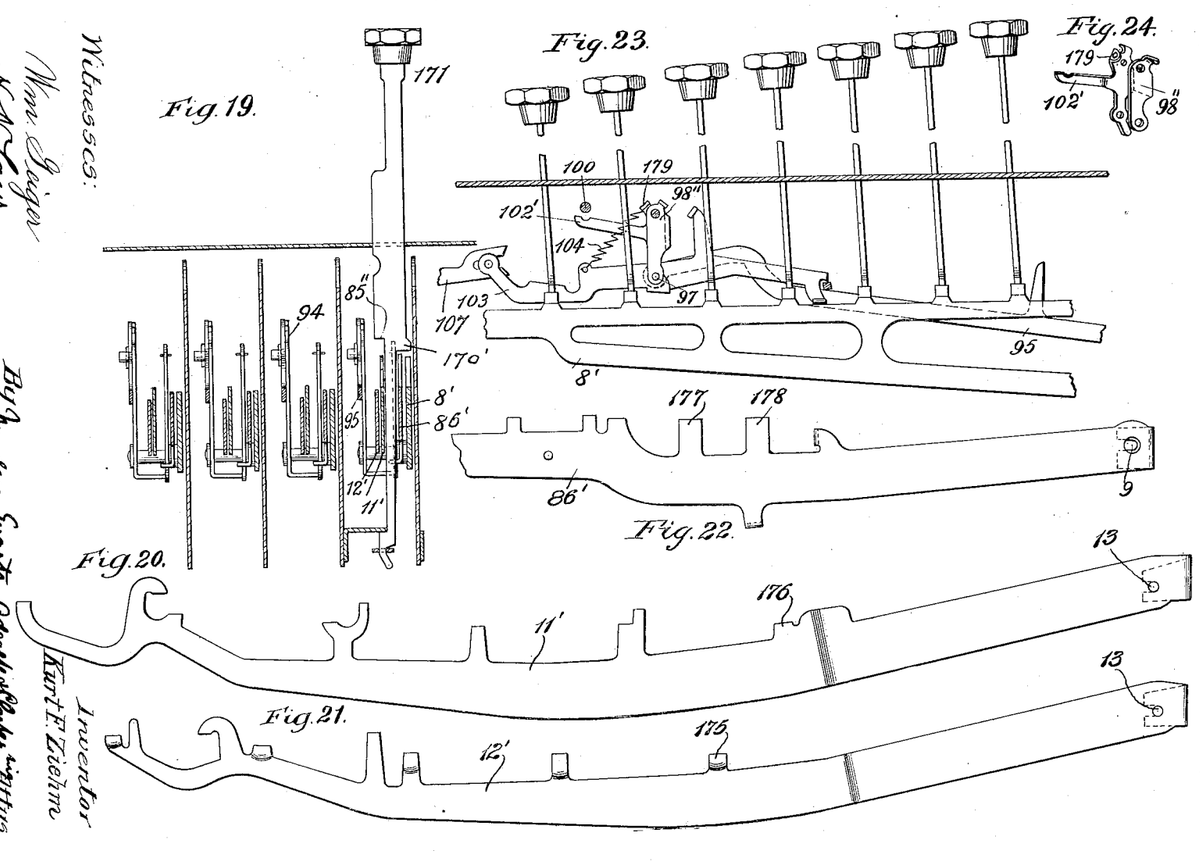
Fig. 19 is a vertical cross section on line XIX—XIX of Fig. 16, showing a portion of the machine.
Figs. 20 and 21 show respectively side views of the odd and even stop levers, of the units column of the machine shown in Figs. 16 to 19.
Fig. 22 is a side view of the rear portion of the auxiliary or lock lever of said units column.
Fig. 23 is a vertical longitudinal section of a portion of a machine in which the hooks for normally locking the column actuator are omitted.
Fig. 24 is a perspective view of the suspending links used in this latter form of machine.

The stop levers 11′, 12′ for this units column (Figs. 20 and 21) are correspondingly constructed with additional steps 175, 176 to be engaged by the shoulders 85″ on the left side of the stems of said keys 171, 172 (Fig. 19).

The auxiliary or lock lever 86′ (Fig. 22), which coöperates with the column actuator 8′ in said column, is provided with corresponding surfaces or steps 177, 178 for engagement by the said shoulders 170′, whereby it is actuated a little in advance of the actuator 8′ to release the hook 83. For this purpose the steps 177, 178 are made a little higher than the corresponding steps on the column actuator. The other keys, one to nine, in this units column give this preliminary actuation to the lock lever by their spring tubes 79.

I have described the column actuator as normally locked against operation except by key action, this function being performed by the hooks 83 and 82, and it will be so locked where any of the keys operating upon it are two-part as above described; and it may be so normally locked when the keys are unitary, as shown in the construction illustrated by Figs. 1 to 15. And such normal locking of the column actuator, and of the keys by the actuator, prevents any jarring down or depression of the column actuator except by intentional key-action. But such normal and preliminary locking of the said actuator and keys is not necessary to the other locking functions hereinbefore described (which are in the illustrated embodiment of the invention performed by the detent 108 and pawl 137), but the hooks 83, 82 may be omitted. This leaves or may leave the accumulator mechanism and the keys normally free for operation. This construction is shown in Figs. 23 and 24. The link 95 is pivoted at 97 to swing-links 98", which are similar in function to the links 98 excepting that they do not have a pin 98' to release the hook 83, the latter being absent in this construction. The links 98" are limited in their forward swinging by an arm 102' which is adapted to encounter the under side of the rod 100, and are formed with an eye 179 connected by the spring 104 with the lever 103. The rest of the machine not shown in Fig. 23 is or may be of the same construction as that shown in Figs. 1 to 15, or as shown in said Patent No. 1,072,933.

It will be understood that the invention, and the combination of parts herein claimed, may be embodied in other forms than those illustrated.

What is claimed is:

1. In a multiple-order key-driven calculating machine, in combination: accumulator mechanism including numeral wheels; column actuators by means of which the motion of a key is communicated to the accumulator mechanism; denominational series of unitary keys which are provided with means moving constantly with the key button for actuating both the said column actuators and a locking mechanism; and said locking mechanism normally holding the column actuators inoperative; substantially as specified.

2. In a multiple-order key-driven calculating machine, in combination: accumulator mechanism including numeral wheels; column actuators by means of which the motion of a key is communicated to the accumulator mechanism; denominational series of unitary keys the stems of which are provided with means substantially rigid with the key button for actuating both the said column actuators and a locking mechanism; and said locking mechanism normally holding the column actuators inoperative; substantially as specified.

3. In a multiple-order key-driven calculating machine, in combination: adding mechanism including numeral wheels; denominational series of unitary keys provided with means moving constantly with the key button for actuating both the said adding mechanism and the locking mechanism; and said locking mechanism adapted to lock a key, after its adding movement, against a further adding movement until the key has been restored to normal position, the locking being ordinally controlled by a single key in each of said orders; substantially as specified.

4. In a multiple-order key-driven calculating machine, in combination: adding mechanism including numeral wheels; denominational series of unitary keys for actuating both the said adding mechanism and the two reverse locking mechanisms; and said two reverse locking mechanisms guarding a key against mis-manipulation during its first movement and during its return movement, respectively; one of said locking mechanisms acting on the adding mechanism independently of the key; substantially as specified.

5. In a multiple-order key-driven calculating machine, in combination: accumulator mechanism including numeral wheels; denominational series of unitary keys which are provided with means substantially rigid with the key button for actuating both the said accumulator mechanism and a locking mechanism; and said locking mechanism adapted to lock the accumulator mechanism and through the accumulator mechanism to lock a key after a complete adding movement of said key, against a further adding movement of said key, until the key has been restored to normal position; substantially as specified.

6. In a multiple-order key-driven calculating machine, in combination: accumulator mechanism including numeral wheels; denominational series of unitary keys which are provided with means substantially rigid with the key button for actuating both the said accumulator mechanism and a locking mechanism; and said locking mechanism acting, during the normal reciprocations of a key, to lock the accumulator mechanism against additive movement while the reciprocation of the key is not additive and leave the accumulator mechanism free during the other reciprocation of the key, said locking mechanism also acting to prevent reverse movement of a key during its said other reciprocation; substantially as specified.

7. In a multiple-order key-driven calculating machine, in combination: accumulator mechanism including numeral wheels; denominational series of unitary keys which are provided with means substantially rigid with the key buttons for actuating both the said accumulator mechanism and a locking mechanism, and said locking mechanism comprising devices adapted to lock a key, after a complete adding movement thereof, against a further adding movement, and which releases the key upon the return of the latter to normal position, the said locking devices acting on the accumulator mechanism independently of the key; substantially as specified.

8. In a multiple-order key-driven calculating machine, in combination: accumulator mechanism including numeral wheels; column actuators and lock levers; demoninational series of unitary keys which are provided with means substantially rigid with the key buttons for depressing the column actuators and auxiliary levers; transmission devices including ratchets whereby the column actuators drive the accumulator mechanism; detents for locking the accumulator mechanism; pawls for locking the said ratchets; and connections between the lock levers and the said detents and pawls; substantially as specified.

9. In a multiple-order key-driven calculating machine, in combination: actuating means and transmission devices; accumulator mechanism including numeral wheels; denominational series of unitary keys which are provided with means moving constantly with the key buttons for driving the said accumulator mechanism and actuating the locking mechanism; and said locking mechanism for locking the accumulator mechanism after a complete additive movement of a key and until the key returns to normal position; said locking means operating on the transmission devices which drive the accumulator mechanism; substantially as specified.

10. In a multiple-order key-driven calculating machine, in combination: accumulator mechanism including numeral wheels; actuating means and transmission devices, including a ratchet, for driving the accumulator mechanism; denominational series of unitary keys which are provided with means moving constantly with the key button for driving the said actuating means and operating the locking mechanism; and said locking mechanism for locking the accumulator mechanism after a complete additive movement of the key and until the key returns to normal position, said locking means operating on the ratchet which drives the accumulator mechanism; substantially as specified.

11. In a multiple-order key-driven calculating machine, in combination: adding mechanism including numeral wheels; denominational series of unitary keys provided with means substantially rigid with the key buttons for actuating the said adding mechanism and for actuating the locking mechanism and devices; said locking mechanism comprising devices adapted to lock a key, after a complete adding movement thereof, against a further adding movement, and which releases the key upon its return to normal position; and devices adapted, on partial depression and release of a key, to lock the keys in other columns of the said adding mechanism against depression; and means for releasing the latter keys; substantially as specified.

12. In a multiple-order key-driven calculating machine, in combination: adding mechanism including numeral wheels; column actuators for driving the said adding mechanism; denominational series of unitary keys for actuating the said column actuators and for actuating the locking mechanisms; two reverse locking mechanisms guarding such keys against mis-manipulation, during their first movement and during their return movement, respectively, the locking being operable by a plurality of keys manipulated simultaneously in separate orders; and a normal locking mechanism acting directly on the said column actuators, the unlocking of said normal locking mechanism acting to position the parts for the operations of the said reverse locking mechanisms during the further movements of the keys; substantially as specified.

13. In a multiple-order key-driven calculating machine, in combination: accumulator mechanism including numeral wheels and carrying mechanisms; unitary driving keys therefor; transmission devices for actuating the accumulator mechanism, including column actuators having surfaces for engagement by the keys and operable, in co-action with said carrying-mechanisms, in a plurality of orders simultaneously; lock levers arranged by the column actuators, the column actuators and lock levers having corresponding surfaces for engagement by the same parts of the keys, and arranged for the preliminary actuation of the lock levers and the subsequent actuation of the column actuators; and locking mechanism controlled by the said lock levers; the locking being operable by a plurality of keys manipulated simultaneously in separate orders, and being ordinally controlled by a single key in each of said orders; substantially as specified.

14. In a multiple-order key-driven calculating machine, in combination: accumulator mechanism including numeral wheels and carrying mechanisms; driving keys therefor; transmission devices for actuating the accumulator mechanism, including column actuators having surfaces for engagement by the keys and operable, in co-action with said carrying-mechanisms, in a plurality of orders simultaneously; lock levers arranged by the column actuators and having surfaces, for engagement by the same parts of the keys, which are higher than the corresponding surfaces of the column actuators; and locking mechanism controlled by the said lock levers; the locking being operable by a plurality of keys manipulated simultaneously in separate orders, and being ordinally controlled by a single key in each of said orders; substantially as specified.

15. In a multiple-order key-driven calculating machine, in combination: adding mechanism including numerical wheels and carrying mechanism adapted to permit prime actuations of the adding mechanism in a plurality of orders simultaneously; denominational series of unitary keys so operable simultaneously and provided with means moving constantly with the key button for actuating both the said adding mechanism and the locking mechanism; and said locking mechanism adapted to lock a key, after its adding movement, against a further adding movement until the key has been restored to normal position, the locking being operable by a plurality of keys manipulated simultaneously in separate orders, and being ordinally controlled by a single key in each of said orders; substantially as specified.

16. In a multiple-order key-driven calculating machine, in combination: adding mechanism including numeral wheels and carrying mechanism adapted to permit prime actuations of the adding mechanism in a plurality of orders simultaneously; denominational series of unitary keys so operable simultaneously and provided with means substantially rigid with the key buttons for actuating the said adding mechanism and for actuating the locking mechanism and devices; said locking mechanism comprising devices adapted to lock a key, after a complete adding movement thereof, against a further adding movement, and which releases the key upon its return to normal position; devices adapted, on partial depression and release of a key, to lock the keys in other columns of the said adding mechanism against depression; and means for releasing the latter keys; the locking being operable by a plurality of keys manipulated simultaneously in separate orders, and being ordinally controlled by a single key in each of said orders; substantially as specified.

17. In a multiple-order key-driven calculating machine, in combination: accumulator mechanism including numeral wheels and carrying mechanism adapted to permit prime actuations of the accumulator mechanism in a plurality of orders simultaneously; driving keys therefor and so operable simultaneously; transmission devices for actuating the accumulator mechanism; including column actuators having surfaces for engagement by the keys; lock levers arranged by the column actuators and having surfaces, for engagement by the same parts of the keys, which are higher than the corresponding surfaces of the column actuators; and locking mechanism controlled by the said lock levers; the locking being operable by a plurality of keys manipulated simultaneously in separate orders, and being ordinally controlled by a single key in each of said orders; substantially as specified.

18. In a multiple-order key-driven calculating machine, in combination: adding mechanism including numeral wheels; denominational series of unitary keys provided with means moving constantly with the key button for actuating both the said adding mechanism and the locking mechanism; and said locking mechanism adapted to lock a key, after its adding movement, against a further adding movement until the key has been restored to normal position, the locking being ordinally controlled by a single key in each of said orders, and the adding mechanism being normally free for operation until locked; substantially as specified.

19. In a multiple-order key-driven calculating machine, in combination: adding mechanism including numeral wheels; denominational series of unitary keys provided with means substantially rigid with the key buttons for actuating the said adding mechanism and for actuating the locking mechanism and devices; said locking mechanism comprising devices adapted to lock a key, after a complete adding movement thereof, against a further adding movement, and which releases the key upon its return to normal position; and devices adapted, on partial depression and release of a key, to lock the keys in other columns of the said adding mechanism against depression; and means for releasing the latter keys, the adding mechanism being normally free for operation until locked; substantially as specified.

20. In a multiple-order key-driven calculating machine, in combination: accumulator mechanism including numeral wheels and carrying mechanisms; driving keys therefor; transmission devices for actuating the accumulator mechanism, including column actuators having surfaces for engagement by the keys and operable, in coaction with said carrying-mechanisms, in a plurality of orders simultaneously; lock levers arranged by the column actuators and having surfaces, for engagement by the same parts of the keys, which are higher than the corresponding surfaces of the column actuators; and locking mechanism controlled by the said lock levers, the column actuators being normally free for operation until locked; the locking being operable by a plurality of keys manipulated simultaneously in separate orders, and being ordinally controlled by a single key in each of said orders; substantially as specified.

21. In a multiple-order key driven calculating machine, in combination: accumulator mechanism including numeral wheels; column actuators by means of which the motion of a key is communicated to the accumulator mechanism; denominational series of unitary keys all parts of the heads of which are free to move with the finger at the initial part of the stroke and which are provided with means for actuating both the said column actuators and a locking mechanism; and said locking mechanism normally holding the column actuators inoperative; substantially as specified.

In testimony whereof I affix my signature in presence of two witnesses.

KURT F. ZIEHM.

Witnesses:
 PHILIP E. KUNTZ,
 SCHUYLER C. BROWN.